3,632,735
METHOD OF STABILIZING FOWL RED BLOOD CELLS FOR USE IN HEMATOLOGY CONTROL COMPOSITIONS

Donald A. Kita, Jackson Heights, N.Y., assignor to Chas. Pfizer & Co., Inc., New York, N.Y.
No Drawing. Continuation of abandoned application Ser. No. 589,987, Oct. 7, 1966, which is a continuation-in-part of abandoned application Ser. No. 506,219, Nov. 3, 1965. This application Mar. 11, 1970, Ser. No. 18,726
Int. Cl. G01n 1/00, 33/16
U.S. Cl. 424—3                                                         8 Claims

ABSTRACT OF THE DISCLOSURE

A novel method for stabilizing red blood cells for hematology counting purposes such as red blood cell and white blood cell counting and useful compositions containing such treated cells.

CROSS-REFERENCE TO RELATED APPLICATIONS

This application is in part a continuation of the co-pending U.S. application Ser. No. 589,987, filed Oct. 7, 1966, now abandoned, which was in turn a continuation-in-part of Ser. No. 506,219, filed Nov. 3, 1965, now abandoned.

BACKGROUND OF THE INVENTION

This invention relates to diagnostic compositions. More particularly, it relates to stabilized and standardized suspensions of red blood cells that provide reference controls for hematologic determinations of white blood cell and red blood cell counts in human blood.

With the advent of automatic devices capable of performing multiple hematological determinations, a growing need has developed for cross-reference samples for manual and automated machine analyses.

SUMMARY OF THE INVENTION

In general this invention relates to a standardized and stabilized suspension of human red blood cells that provides a reference control for red blood cell counts in human blood and a standardized and stabilized suspension of fowl red blood cells that simulate human white blood cells and provide a reference control for white blood cell counts in human blood.

An embodiment of this invention is an improved method for stabilizing fowl red blood cells for use as a control in human white blood cell counting which comprises:

(a) Commingling a fowl red blood cell 0.45% saline suspension wherein said cells comprise about 8% by volume of said suspension and an equal volume of a 1% solution by weight of mercuric chloride in 0.45% saline;

(b) Heating the resulting mixture at 37° C. for about 19 hours, recovering and resuspending the solid materials as a 4% by volume suspension in saline; and (c) Combining therewith an equal volume of a 0.0025% weight/volume solution of tannic acid in saline, incubating the resulting mixture at about 50° C. and recovering the solid product.

DETAILED DESCRIPTION OF THE INVENTION

This invention is concerned with a method for stabilizing human and fowl red blood cells for use as a reference control for counting red blood cells and white blood cells in human blood.

The novel method of this invention comprises:

(a) Commingling a red blood cell-saline suspension wherein said cells comprise up to about 50% by volume of said suspension, and an equal volume of a 1 to 3% solution by weight of mercuric chloride in saline;

(b) Heating the resulting mixture at 37° C. for at least 12 hours, recovering and resuspending the solid materials as a 2 to 6% by volume suspension in saline; and (c) Combining therewith an equal volume of a 0.0025% weight/volume solution of tannic acid in saline, incubating the resulting mixture at about 50° C. for about 30 to 60 minutes, and recovering the solid product.

The novelty of this method for stabilizing red blood cells resides in its ability to provide cells which maintain their cell characteristics of shape and size after stabilization. This ability is of utmost importance since it enables the resulting product to be used as a hematology control. Furthermore, cells treated as described above are suitably stable for reasonable periods of time. Even when suspended in distilled water, the red blood cells thus stabilized do not rupture.

Up to now, the prior art has been unable to supply a process whereby the treated cells obtained simulate non-treated cells. This, of course, presents a real problem when such cells are to be used as controls in clinical determinations.

Accordingly, the novel method described herein for stabilizing red blood cells provides products which, depending on the type of red blood cells used and the degree of dilution, are useful as controls for red blood cell (RBC) and white blood cell (WBC) counting. It has been found that human red blood cells, when treated by the process of this invention, retain their original cell characteristics, and a standardized suspension provides a useful reference control for red blood cell counts in human blood.

The preparation of red blood cells for a white blood cell reference control presents special problems. Fowl red blood cells are preferred and turkey red blood cells in particular are most preferred. However, it is to be understood that fowl cells such as goose, chicken and duck will provide effective products. The fowl red blood cells are first washed several times with 0.45% w./v. sodium chloride solution and then suspended in 0.45% saline solution prior to the stabilizing treatment. This saline concentration swells the cells so that they closely resemble human white blood cells in size and shape. The size and shape are maintained after the subsequent stabilizing treatment. A standardized suspension of these treated cells provides a novel and useful reference control for white blood cells counts in human blood.

Although there are many techniques for the various hematologic procedures, two of the more important for red blood cell counting in which an efficient control is necessary in order to obtain accurate results by comparison are erythrocyte count and hematocrit or packed cell volume (PCV) determinations. An erythrocyte count is a measure of the number of red blood cells in the blood wherein a normal person will have about $4.5 \times 10^6$ cells/mm.$^3$. A hematocrit determination measures as percent by volume that portion of entire blood which comprises packed red blood cells. A normal person will have a value of about 45%. The leukocyte count is a measure of the number of white blood cells in the blood wherein a normal person will have approximately 7,500 cells/mm.$^3$. The white blood cell control prepared by the novel process disclosed herein serves as a control for both technique and equipment. When used in "normal" and "above normal" concentrations, it provides quality control references for the levels of white cell counts most frequently found.

It is evident, therefore, that a control product must accurately indicate on a comparative basis what a test sample of blood constitutes with regard to the above determinations. It is further evident how important it is for the control product to simulate non-treated cells. It follows, for instance, that if the control product contains cells which are larger in size, the experimental result will be inaccurate, if not wholly meaningless. In essence, the cells treated by the method disclosed herein provides an excellent system of checks and balances so necessary in hematologic determinations.

Regarding the novel method described earlier, it is to be understood that the term "saline" throughout can be any of the following three solutions: 0.9% by weight aqueous sodium chloride solution which is designated by the term "solution A"; 0.45% by weight aqueous sodium chloride solution designated as "solution B"; or a buffered saline solution (solution C). In most instances, the 0.9% solution (solution A) is implied when reference is made to the term saline. However, in the preparation of a white blood cell control by the novel method disclosed herein and, more particularly, in the first step, i.e. (step A) as described earlier, it is important to use the 0.45% solution (solution B) for the reason that at saline concentrations less than 0.45%, the red blood cells autolyze; saline concentrations of greater than 0.45% do not allow for sufficient swelling of the fowl red blood cells so that they approximate the size and shape of human white blood cells.

The first step of the herein disclosed method consists of suspending red blood cells in a saline suspension to provide up to a 50% by volume suspension. Although a concentration as high as 50% will work, it is preferred to use a range from 5% to 10% by volume, and even more preferred to use an 8% suspension. This suspension is combined with an equal volume of a 1 to 3% solution by weight of mercuric chloride in saline. Mercuric chloride was found to be clearly superior to Formalin, giving a more stable red blood cell and, most importantly, the shape of the red blood cell is retained.

The second step consists of heating the resulting mixture at 37° C. for at least 12 hours, and preferably, for about 20 hours. The solid materials are recovered by centrifugation and separation, and then resuspended in saline.

The third step consists of combining with the aforesaid suspension, an equal volume of a 0.0025% w./v. solution of aqueous tannic acid in saline with thorough mixing, incubating the resulting mixture for about 30 to 60 minutes at about 50° C. (this temperature is critical) and recovering the solid product by centrifugation and separation. Regarding this saline solution containing the tannic acid, it is the only instance in the herein disclosed invention where saline solution C described earlier is utilized. It is a buffered saline solution having a pH of 7.2. Its preparation consists of combining the following reagents in the proportions indicated (per liter):

|  | Ml. |
|---|---|
| 0.9 percent saline | 500 |
| 0.15 M disodium phosphate | 385 |
| 0.15 M monopotassium phosphate | 115 |

It is to be understood that although the above method has been described in a step-wise procedure, it is not intended to imply that the process is not continuous. Its purpose is merely to highlight the component steps chronologically.

This invention also contemplates useful compositions which incorporate the blood cells treated in the manner disclosed above. More specifically, such compositions comprise the treated blood cells in suspension with an aqueous mixture containing a preservative amount of a bactericidal agent selected from the group consisting of sodium azide and sodium merthiolate and a suspending medium selected from the group consisting of propylene glycol, glycerol, saline, distilled water, blood plasma and blood serum; wherein said blood cells comprise up to about 70% by volume of the total composition. With regard to this latter percent by volume limitation, the preferred amount will depend on the final use and the type of formulation desired. For example, for a red blood cell control, percent by volume compositions of from 10% to about 70% are preferred since they simulate the range from normal to abnormal conditions. On the other hand, for a white blood cell control a percent by volume composition of less than 1% is preferred, and less than 0.5% is most preferred.

A preservative amount of bactericidal agent will in most cases be an amount providing about 0.05% to about 0.1% weight/volume of the aqueous mixture, however, the above range is not critical and can be more or less depending on the type of product prepared. It is therefore essentially any amount which will effectively prevent the growth of organisms.

Particularly effective compositions are those using sodium azide as bactericidal agent and either propylene glycol or glycerol as the suspending medium. Glycerol or propylene glycol is added for viscosity to minimize evaporation and insure that the red blood cell count does not vary. These compositions are prepared to reflect various typical concentrations. For instance, when used as red blood cell controls, compositions containing a 47% by volume concentration will be prepared as a PCV control for the normal male with a corresponding erythrocyte count of approximated $5 \times 10^6/mm.^3$, and a 42% concentration will be formulated as a PVC control for the normal female with a corresponding erythrocyte count of $4.5 \times 10^6/mm.^3$. To simulate pathologic condition, controls may be formulated in ranges of hematocrit and erythrocyte count below normal (e.g., 15% PVC with a corresponding erythrocyte count of approximately $1.7 \times 10^6/mm.^3$).

In the preparation of a white blood cell control, a 4% suspension which is diluted by a factor of 1:18 with the appropriate suspension medium containing the bactericidal agent will provide a count of approximately 7,500 cells/mm.$^3$ (normal) whereas a dilution of 1:6–7 will provide a count of approximately 17,500 cells/mm.$^3$ (above normal).

The following examples are given by way of illustration and are not to be construed as limitations of this invention, many variations of which are possible without departing from the spirit or scope thereof.

EXAMPLE I

Human red blood cells which were stored at 4° C. in an acid-citrate-dextrose (ACD) solution are washed 4 times in saline (solution A=0.9% by weight aq. NaCl) (3300 r.p.m./20 min. each washing) and after the final wash, are resuspended as an 8% by volume suspension in saline (solution A). To 100 ml. of this 8% suspension is added 100 ml. of a 1% solution by weight of mercuric chloride in saline (solution A) and the resulting suspension is mixed thoroughly. After said agitation, the suspension is incubated at 37° C. for 19 hours, centrifuged, washed 4 times with distilled water (1200 r.p.m./5–7 min. each washing), and resuspended in saline (solution A) as a 4% by volume suspension (200 ml.). To this 4% suspension is added 200 ml. of a 0.0025% weight/volume solution of tannic acid in buffered saline (solution C) and the resulting mixture is mixed thoroughly, incubated at 50° C. for 30 min., centrifuged, and washed three times with distilled water.

EXAMPLE II

The procedure of Example I is repeated wherein the following percent by volume saline suspensions of human red blood cells are used in place of an 8% by volume suspension and the final product obtained in each instance is satisfactory:

1% by volume
5% by volume

10% by volume
25% by volume
50% by volume

EXAMPLE III

The procedure of Example I is repeated wherein an equal volume of a 2% and a 3% solution by weight of mercuric chloride in saline (solution A) is used in lieu of the 1% by weight solution and comparable results are obtained.

EXAMPLE IV

The procedure of Example I is repeated wherein the mercuric chloride treated red blood cell suspension is heated at 37° C. for the following time periods with comparable results:

12 hours
15 hours
25 hours
30 hours

EXAMPLE V

The procedure of Example I is repeated wherein the solid materials obtained after mercuric chloride treatment are resuspended as 2% and 6% by volume suspensions in saline (solution A) instead of as a 4% by volume suspension and substantially the same results are obtained.

EXAMPLE VI

The products obtained by the procedures of Examples I, II, III, IV and V are converted to the finished composition suitable for use as controls in red blood cell counting by the following general procedure:

The products obtained from the above examples are resuspended in an aqueous mixture containing a bactericidal agent and a suspending medium by automatic mixing with a device for at least 30 minutes. The following 50% by volume compositions of recovered product are prepared by the procedure outlined above:

(A)

Recovered product (mercuric chloride-tannic acid treated human red blood cells)—100 ml.
Sodium azide—0.1 g.
Propylene glycol-water (90:10)—100 ml.
Recovered product—100 ml.

(B)

Recovered product—100 ml.
Soduim azide—0.1 g.
Glycerol-water (90:10)—100 ml.

(C)

Recovered product—100 ml.
Sodium azide—0.1 g.
Saline (solution A)—100 ml.

(D)

Recovered product—100 ml.
Sodium azide—0.1 g.
Distilled water—100 ml.

(E)

Recovered product—100 ml.
Sodium azide—0.1 g.
Blood plasma—100 ml.

(F)

Recovered product—100 ml.
Sodium azide—0.1 g.
Blood serum—100 ml.

The compositions A–F are prepared wherein an equal amount of sodum merthiolate is substituted for sodium azide with comparable results.

EXAMPLE VII

The compositions as described in Example VI are prepared wherein 20 ml. of recovered product is added to 180 ml. of corresponding medium to formulate the appropriate 10% by volume suspensions.

EXAMPLE VIII

Turkey red blood cells which are collected in Alsevers solution are washed 3 times in saline (solution B, 0.45% w./v.) 3300 r.p.m./5 min. each washing, and after the final wash are resuspended as an 8% by volume suspension in saline (solution B). To 100 ml. of this 8% suspension of turkey red blood cells is added 100 ml. of a 1% solution by weight of mercuric chloride in saline (solution A) and the resulting suspension is mixed thoroughly. After said agitation, the suspension is incubated at 37° C. for 18–20 hours. Without disturbing the cells, the thin murky layer resting on top of the settled cells is suctioned off. The resulting suspension is then centifuged, washed 4 times with distilled water (3300 r.p.m./5 min. each washing), and resuspended in saline (solution A) as a 4% by volume suspension (200 ml.). To this 4% suspension is added 200 ml. of a 0.0025% weight/volume solution of tannic acid in buffered saline (solution C) and the resulting mixture is mixed thoroughly, incubated at 50° C. for about 30 to 60 min., allowed to stand at room temperature for 18–20 hours, centrifuged, and washed 3 times with distilled water.

EXAMPLE IX

The procedure of Example VIII is repeated wherein the following percent by volume saline suspensions of turkey red blood cells are used instead of an 8% by volume suspension and the final product obtained in each instance is satisfactory: 1%, 5%, 10%, 25%, and 50%.

EXAMPLE X

The procedure of Example VIII is repeated wherein an equal volume of a 2% and a 3% solution by weight of mercuric chloride in saline (solution B) is used in lieu of the 1% by weight solution and comparable results are obtained.

EXAMPLE XI

The procedure of Example VIII is repeated wherein the mercuric chloride treated red blood cell suspension is heated at 37° C. for the following time periods with comparable results:

12 hours
15 hours
25 hours
30 hours

EXAMPLE XII

The procedure of Example VIII is repeated wherein the solid materials obtained after mercuric chloride treatment are resuspended as 2% and 6% by volume suspensions in saline (solution A) instead of as a 4% by volume suspension and substantially the same results are obtained.

EXAMPLE XIII

The products obtained by the procedures of Examples VIII, IX, X, XI and XII are converted to the finished compositions suitable for use as controls in white blood cell counting by the following general method:

The products obtained from the above examples are resuspended in an aqueous mixture containing a bactericidal agent and a suspending medium by automatic mixing with a mixing device for at least 30 min. The following 4% by volume compositions of recovered product are prepared by the procedure outlined above:

(A)

| | Ml. |
|---|---|
| Recovered product | 4.1 |
| Sodium azide (.1 gm.) | |
| Propylene glycol-water (50:50 vol.) | 100.0 |
| | 104.1 |

(B)
Recovered product—4.0 ml.
Sodium azide—.1 gm.
Propylene glycol-water (70:30 vol.)—100 ml.

(C)
Recovered product—4.0 ml.
Sodium azide—.1 gm.
Glycerol-water (50:50 vol.)—100 ml.

(D)
Recovered product—4.0 ml.
Sodium azide—.1 gm.
Saline (solution B)—100 ml.

(E)
Recovered product—4.0 ml.
Sodium azide—.1 gm.
Distilled water—100 ml.

(F)
Recovered product—4.0 ml.
Sodium azide—.1 gm.
Blood plasma—100 ml.

(G)
Recovered product—4.0 ml.
Sodium azide—.1 gm.
Blood serum—100 ml.

The compositions A–G are diluted approximately on a 1:18 parts by volume ratio, i.e., 1 part volume of compositions A–G plus 18 parts volume of the corresponding suspending medium-bactericidal agent mixture. This latter dilution provides a control which gives a count of approximately 7,500 cells/mm.$^3$ ("normal value"). When the compositions A–G are diluted approximately on a 1:6–7 parts by volume ratio, controls which give a count of approximately 17,500/mm.$^3$ (above normal value) are provided.

The compositions A–G are prepared wherein an equal amount of sodium merthiolate is substituted for sodium azide with comparable results.

EXAMPLE XIV

The procedure of Example VIII is repeated wherein the following red blood cells are used in lieu of turkey red blood cells and the recovered products are essentially equivalent: goose blood cells, and chicken blood cells.

What is claimed is:
1. An improved method for stabilizing fowl red blood cells for use as a control in human white blood cell counting which comprises:
(a) commingling a suspension of fowl red blood cells in 0.45% saline wherein said cells comprise about 8% by volume of said suspension and an equal volume of a 1% solution by weight of mercuric chloride in 0.45% saline;
(b) heating the resulting mixture at 37° C. for about 19 hours, recovering and resuspending the solid materials as a 4% by volume suspension in saline; and
(c) combining therewith an equal volume of a 0.0025% weight/volume solution of tannic acid in saline, incubating the resulting mixture for about 30 to 60 minutes at about 50° C. and recovering the solid product.

2. The method of claim 1 wherein said fowl red blood cells are turkey red blood cells.

3. The method of claim 1 wherein the recovered product is suspended in an aqueous solution containing sodium azide and propylene glycol.

4. The method of claim 1 wherein the recovered product is suspended in an aqueous solution containing sodium azide and glycerol.

5. A stabilized fowl red blood cell composition suitable for use as a control in white blood cell counting consisting essentially of treated fowl red blood cells prepared by the method of claim 1 in suspension with an aqueous mixture containing a preservative amount of a bactericidal agent selected from the group consisting of sodium azide and sodium merthiolate and a suspending medium selected from the group consisting of propylene glycol, glycerol, saline, distilled water, blood plasma and blood serum; wherein said blood cells comprise up to about 1% by volume of the total composition.

6. The composition of claim 5 wherein said fowl red blood cells are turkey red blood cells.

7. The composition of claim 5 wherein said bactericidal agent is sodium azide and said suspending medium is propylene glycol.

8. The composition of claim 5 wherein said bactericidal agent is sodium azide and said suspending medium is glycerol.

References Cited

Strausser, Ph.D Thesis, Rutgers Univ., June, 1958, pp. 18–22, 35–36, 43–43, (microfilm 59–1831, University Microfilms, Ann Arbor, Mich.).

Wide, Acta Endocinologica, vol. 35, October 1960, pp. 261–262.

Chem. Abs., vol. 55, 1961, pp. 15604b, 27780–1.

Doebbler, Biochim et Biophys Acta, vol. 58, 1962, pp. 449–458.

ALBERT T. MEYERS, Primary Examiner

A. P. FAGELSON, Assistant Examiner

U.S. Cl. X.R.

252—408